(12) United States Patent
Parkey

(10) Patent No.: US 10,315,498 B2
(45) Date of Patent: Jun. 11, 2019

(54) FRONT AND REAR LATCHES FOR TONNEAU SYSTEM

(71) Applicant: Tectum Holdings Inc., Ann Arbor, MI (US)

(72) Inventor: John Parkey, Plymouth, MI (US)

(73) Assignee: Tectum Holdings Inc., Ann Arbor, MI (US)

( * ) Notice: Subject to any disclaimer, the term of this patent is extended or adjusted under 35 U.S.C. 154(b) by 0 days.

(21) Appl. No.: 15/725,688

(22) Filed: Oct. 5, 2017

(65) Prior Publication Data

US 2019/0105974 A1    Apr. 11, 2019

(51) Int. Cl.
*B60J 7/14* (2006.01)
*B60J 7/19* (2006.01)
*B60P 7/02* (2006.01)

(52) U.S. Cl.
CPC .............. *B60J 7/198* (2013.01); *B60J 7/141* (2013.01); *B60P 7/02* (2013.01)

(58) Field of Classification Search
CPC ... B60J 7/198; B60J 7/141; B60P 7/02; F16B 2/185
USPC .......................... 296/100.07, 100.09, 136.03
See application file for complete search history.

(56) References Cited

U.S. PATENT DOCUMENTS

| | | | |
|---|---|---|---|
| 3,146,824 A | 9/1964 | Veilleux | |
| 4,563,034 A | 1/1986 | Lamb | |
| 4,786,099 A | 11/1988 | Mount | |
| 4,889,381 A | 12/1989 | Tamblyn | |
| 5,184,564 A | 2/1993 | Robbins et al. | |
| 5,251,950 A | 10/1993 | Bernardo | |
| 5,636,893 A | 6/1997 | Wheatley et al. | |
| 5,653,491 A | 8/1997 | Steffens et al. | |
| 5,758,921 A | 6/1998 | Hall | |
| 6,053,556 A | 4/2000 | Webb | |
| 6,352,296 B1 | 3/2002 | Kooiker | |
| 7,047,576 B2 | 5/2006 | Tavivian | |
| 7,070,374 B2 * | 7/2006 | Womack ............... | B60P 7/0815 410/104 |
| 7,188,888 B2 | 3/2007 | Wheatley et al. | |
| 7,252,322 B2 | 8/2007 | Rusu | |
| 7,404,586 B2 | 7/2008 | Seiberling | |

(Continued)

FOREIGN PATENT DOCUMENTS

WO    2003/006889 A2    1/2003

*Primary Examiner* — Gregory A Blankenship
(74) *Attorney, Agent, or Firm* — The Dobrusin Law Firm, PC

(57) ABSTRACT

A latch assembly comprising: (I) a head having: (a) two corners; and (b) two fillets that are each connected to the two corners by a sidewall that extends between each of the two fillets and each of the two corners; and (II) an engaging portion coupled to the head, the engaging portion being configured to engage a wall of a cargo box of a pickup truck to compressibly secure a foldable tonneau system to the cargo box, wherein two of the sidewalls extending between the two corners and the two fillets form a locking portion that is configured to lock the latch assembly in a cross bow member of the foldable tonneau system when the latch assembly is in communication with the cross bow member, and the latch assembly is configured to be insertable and removable from the cross bow member of the foldable tonneau system without disassembly of the cross bow member.

20 Claims, 9 Drawing Sheets

(56) References Cited

U.S. PATENT DOCUMENTS

| | | |
|---|---|---|
| 7,484,788 B2 | 2/2009 | Calder et al. |
| 8,061,758 B2 | 11/2011 | Maimin et al. |
| 8,262,148 B2 | 9/2012 | Rusher et al. |
| 8,511,736 B2 * | 8/2013 | Williamson ........... B60J 7/1607 224/558 |
| 8,814,249 B2 | 8/2014 | Rossi |
| 8,881,464 B1 | 11/2014 | Huckeba |
| 8,960,764 B2 | 2/2015 | Spencer |
| 8,960,765 B2 | 2/2015 | Facchinello et al. |
| 9,211,834 B2 | 12/2015 | Knox |
| 9,290,122 B2 | 3/2016 | Spencer |
| 9,487,071 B1 * | 11/2016 | Yue .......................... B60J 7/141 |
| 9,533,555 B2 | 1/2017 | Facchinello et al. |
| 9,545,835 B2 | 1/2017 | Facchinello et al. |
| 9,630,479 B2 | 4/2017 | Facchinello et al. |
| 9,862,257 B1 * | 1/2018 | Kozlowski ................ B60P 7/02 |
| 2004/0245799 A1 | 12/2004 | Rusu |
| 2007/0035151 A1 | 2/2007 | Rusu |
| 2007/0210609 A1 | 9/2007 | Maimin et al. |
| 2013/0015678 A1 | 1/2013 | Williamson et al. |
| 2016/0096421 A1 * | 4/2016 | Facchinello ............. B60J 7/106 292/256 |
| 2016/0096423 A1 | 4/2016 | Facchinello et al. |
| 2016/0176448 A1 | 6/2016 | Germano et al. |
| 2016/0288691 A1 | 10/2016 | Aubrey et al. |
| 2016/0288720 A1 | 10/2016 | Huebner et al. |
| 2017/0001499 A1 | 1/2017 | Facchinello et al. |
| 2017/0066311 A1 * | 3/2017 | Facchinello ............. B60J 7/198 |
| 2017/0151864 A1 | 6/2017 | Facchinello et al. |
| 2017/0197498 A1 * | 7/2017 | Facchinello ............. B60J 7/198 |
| 2018/0009298 A1 * | 1/2018 | Kozlowski ................ B60P 7/02 |

\* cited by examiner

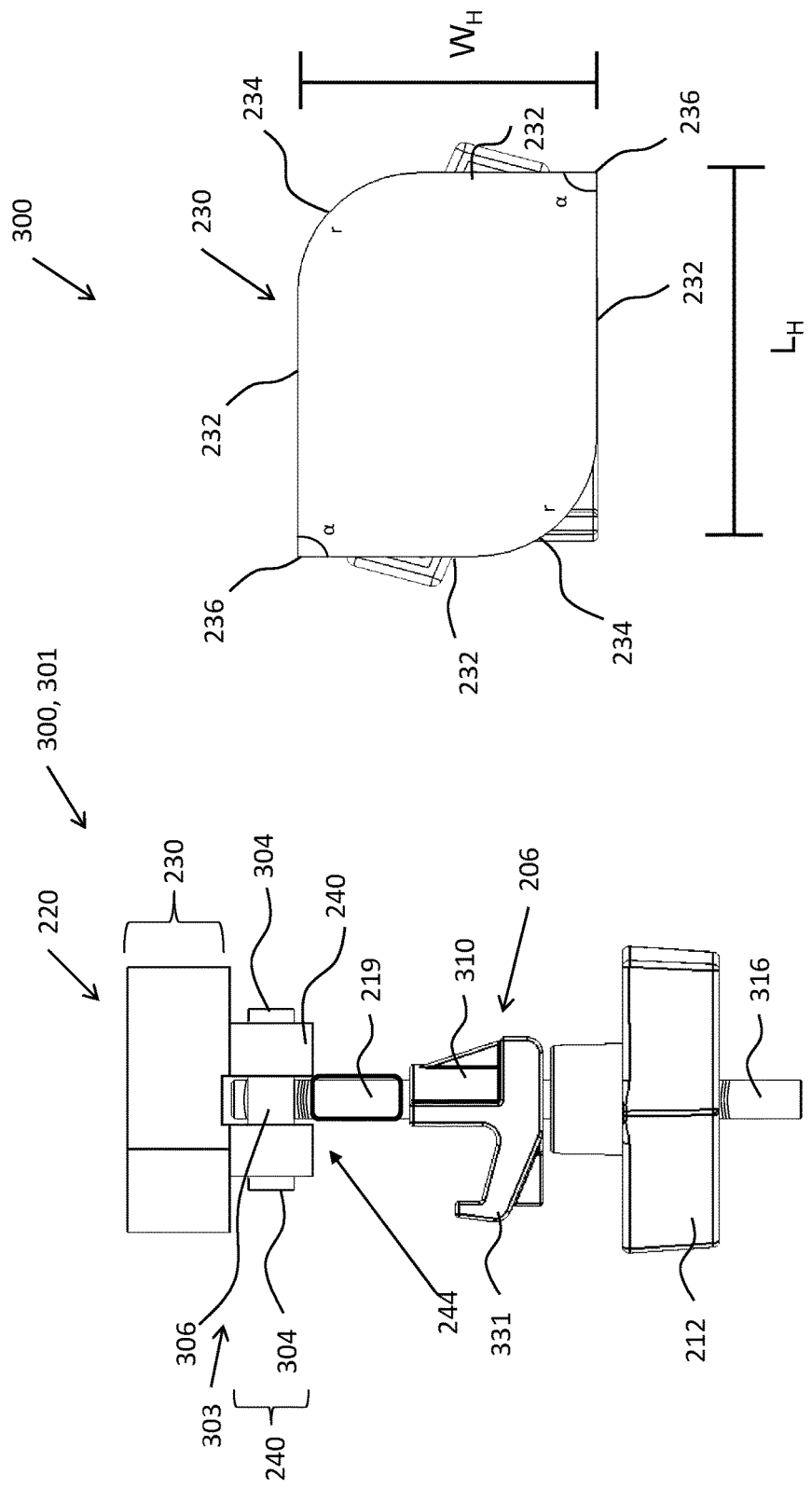

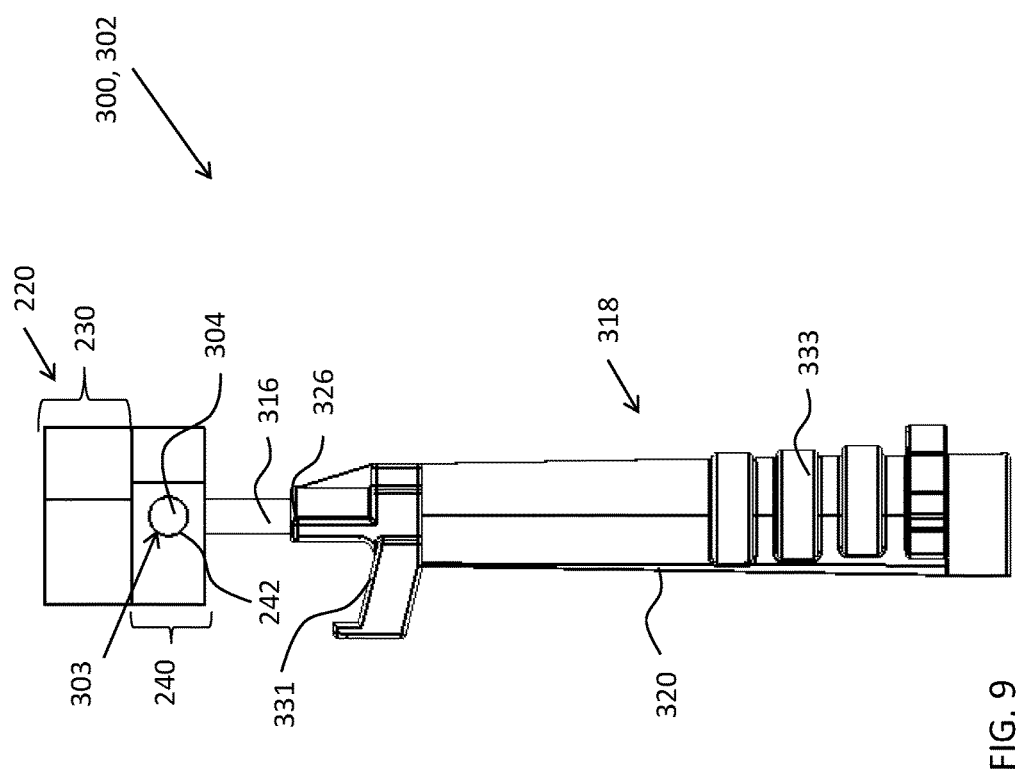

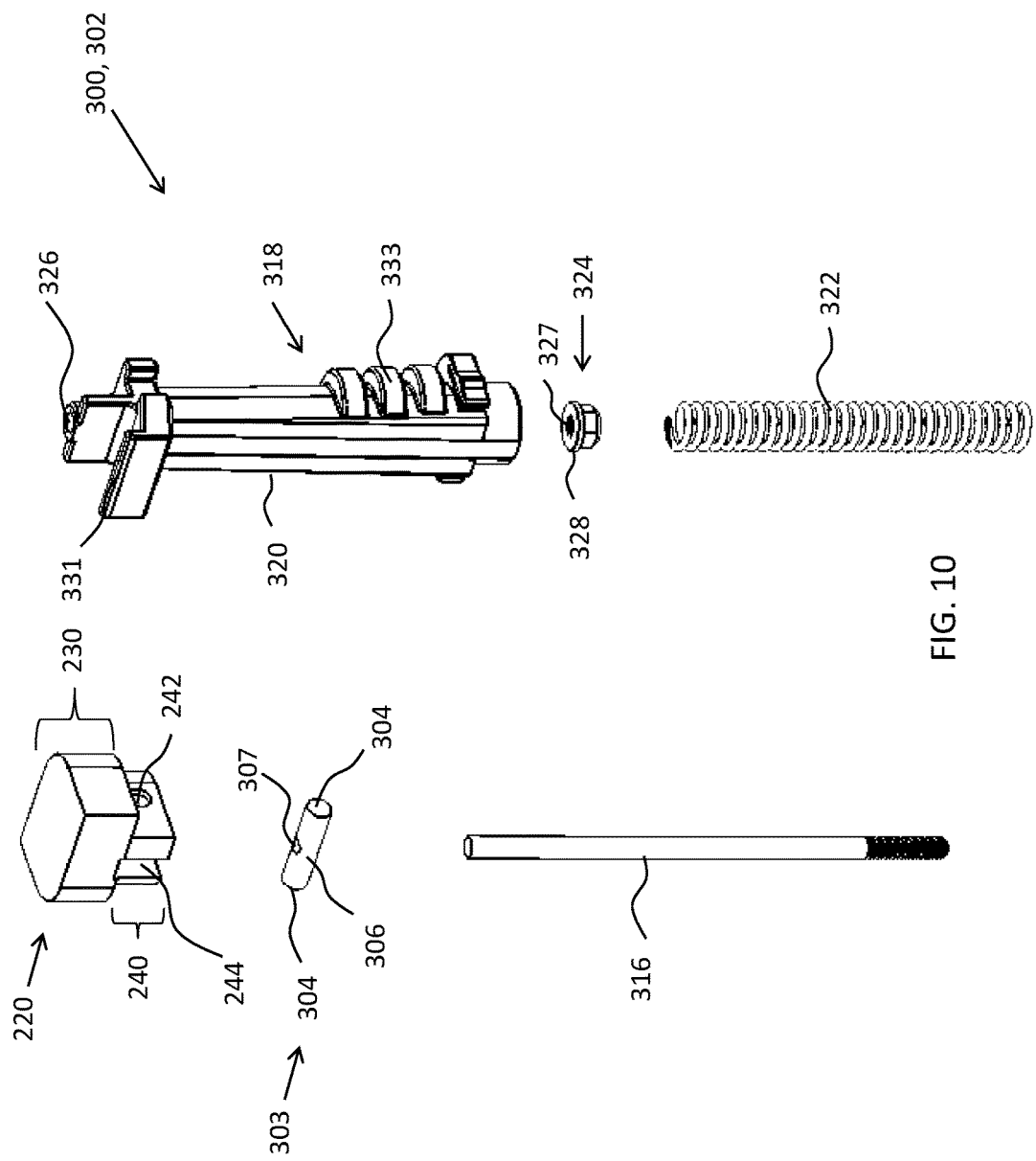

FRONT AND REAR LATCHES FOR TONNEAU SYSTEM

FIELD

The present teachings generally relate to a tonneau system for a vehicle and specifically latches that lock down the front and rear of a tonneau cover.

BACKGROUND

Tonneau systems are typically used to cover and protect a cargo bed or unoccupied portion of a vehicle from environmental degradation. Typical tonneau systems include a plurality of structural members that are attached directly to the vehicle to form a frame. A cover is then secured to the frame, preventing moisture, debris, or unwanted objects from entering the cargo bed or unoccupied portion and damaging cargo or the vehicle itself. The tonneau system may include a rigid frame design, such that when fully assembled and attached to the vehicle, the frame creates a unitary structure. Alternatively, the tonneau system may include one or more hinge-points so that the frame can remain partially attached to the vehicle, yet be folded onto itself to uncover only a portion of the cargo bed or unoccupied portion.

Tonneau frames may be attached to a vehicle using a variety of mechanical fasteners, such as snap-fit clips, bolts, screws, hooks, or a combination thereof. Frequently, to ensure a tightly secured connection between the frame and the vehicle, the tonneau system will use a plurality of latches to secure side members and cross bow members to an interior lip of the vehicle bed. Each latch includes an insertable head on one end adapted to slide in a hollow cavity of the side member or cross bow member, and a latching feature on an opposing end that latches to the lip of the bed, resulting in a compression force between the frame and the vehicle.

The latches are frequently under distress from the compression force between the frame and the vehicle, or daily operation of the vehicle (i.e., driving and loading/unloading the cargo bed). As a result, the latches may fracture, be damaged, or unlock from the vehicle. To replace the broken latches, a technician or consumer may be required to remove the entire side member or cross bow member from the frame, slide out the broken latch, insert a replacement latch, and reassemble the frame. Due to the burdensome process, tonneau system companies frequently send several frame members or even an entire frame replacement to avoid the excess time and cost of servicing the vehicle.

Examples of tonneau systems may be found in U.S. Pat. Nos. 7,188,888; 8,814,249; 8,960,764; 9,290,122; 9,533,555; 9,545,835; and 9,630,479; and U.S. Publication Nos. 2016/0096421; 2016/0096423; 2016/0288691; and 2017/0066311, all of which are incorporated by reference herein for all purposes. It would be attractive to have a tonneau system in which the latches may be removed or installed without disassembling any part of the tonneau system. What is needed is a latch that removably attaches to the side member or cross bow member without disassembling the tonneau system. It would be attractive to have a latch that is adjustably connected to the side member or cross bow member for easy installation of the latch. What is needed is a latch adapted to freely move along a longitudinal axis of the side member or cross bow member. It would be attractive to have a latch that is adapted to remain attached to the side member or cross bow member when the tonneau system is in a folded state (i.e., the tonneau system is folded onto itself at one or more hinge points). What is needed is a latch that is stowable within the side member or cross member.

SUMMARY

The present teachings meet one or more of the present needs by providing: a latch assembly comprising: (I) a head having: (a) two corners; and (b) two fillets that are each connected to the two corners by a sidewall that extends between each of the two fillets and each of the two corners; and (II) an engaging portion coupled to the head, the engaging portion being configured to engage a wall of a cargo box of a pickup truck to compressibly secure a foldable tonneau system to the cargo box, wherein two of the sidewalls extending between the two corners and the two fillets form a locking portion that is configured to lock the latch assembly in a cross bow member of the foldable tonneau system when the latch assembly is in communication with the cross bow member, and the latch assembly is configured to be insertable and removable from the cross bow member of the foldable tonneau system without disassembly of the cross bow member.

The present teachings meet one or more of the present needs by providing: a latch assembly comprising: (I) a head including: (a) a locking portion having: (i) two corners; and (ii) two fillets that are each connected to the two corners by a sidewall that extends between each of the two fillets and each of the two corners, each of the fillets creating a generally arcuate surface; (b) one or more receiving portions projecting from a bottom surface of the locking portion, the one or more receiving portions having one or more receiving holes; (c) a notch located between the one or more receiving portions; and (II) a trunnion assembly secured to the head by the one or more receiving portions and the trunnion assembly being rotatable relative to the head; (III) a threaded member attached to the trunnion assembly; and (IV) an engaging portion coupled to the head by the threaded member and pivotally engaged to the trunnion assembly, wherein the locking portion of the head is configured to engage inside a cross-sectional area of a cross bow member so that the latch assembly is capable of being added to or removed from the cross bow member without disassembly of the cross bow member or the latch assembly.

The present teachings provide: a method comprising: (I) inserting a head of a latch assembly into a cross-sectional area of a cross bow member of a foldable tonneau system so that a length of the head is substantially perpendicular to a width of the cross bow member; and (II) rotating the head within the cross-sectional area so that the length of the head is substantially parallel to the width of the cross bow member, the rotation securing a locking portion of the head on a plurality of flanges of the structural member to allow the latch assembly to slide along a longitudinal axis of the cross bow member.

The present teachings provide a tonneau system in which the latches may be removed or installed without disassembling any part of the tonneau system. The present teachings provide a latch that is adapted to removably attach to a side member or cross bow member. The present teachings provide a latch that is adapted for easy installation in a side member or cross bow member. The present teachings provide a latch that moves freely along a longitudinal axis of the side member or cross bow member once inserted into the side member or cross bow member. The present teachings provide a latch that remains attached to the side member or cross bow member in a stowable position in the side member or cross bow member such that the tonneau system may be folded onto itself without removing or damaging the latches.

BRIEF DESCRIPTION OF THE DRAWINGS

FIG. 6 is an enlarged perspective view of a front latch assembly;

FIG. 7 is an enlarged top view of a locking portion of a head of a latch assembly;

FIG. 9 is an enlarged side view of a rear latch assembly; and

FIG. 10 is an exploded view of a rear latch assembly.

DETAILED DESCRIPTION

Figure 1:
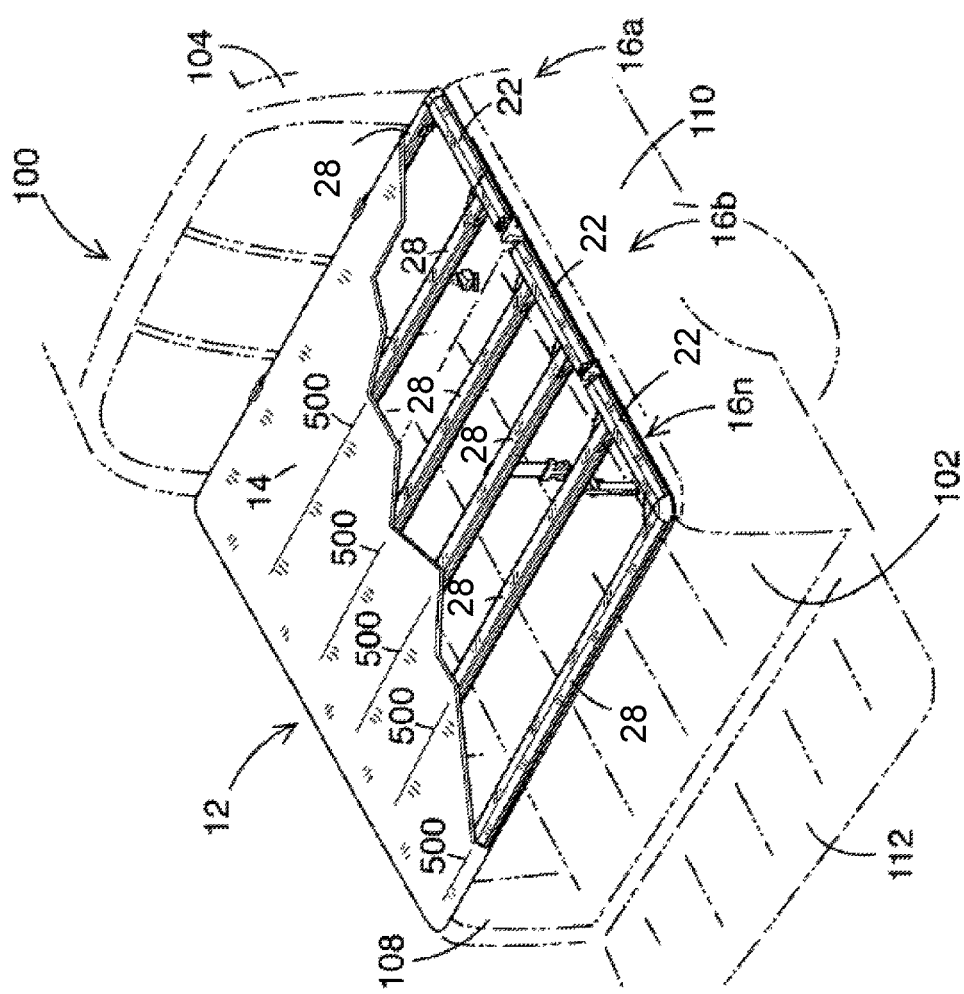
FIG. 1 is a perspective view of a foldable tonneau cover positioned upon a cargo box of a pickup truck.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a foldable tonneau system that secures to a cargo bed or unoccupied portion of a vehicle (i.e., a portion of the vehicle adjacent to or outside of a passenger cabin) (hereinafter referred to as "cargo box"). The foldable tonneau system is adapted to attach to a cargo box of a pickup truck. The cargo box may consist of one or more sidewalls, one or more tailgates, or a combination thereof. The foldable tonneau system may consist of a plurality of tonneau sections. The tonneau sections may be interlocked such that one or more of the tonneau sections are adapted to fold onto one or more additional tonneau sections. The tonneau sections may be connected using a plurality of side members, cross bow members, or both. Each tonneau section may include one or more side members, one or more cross bow members, or both. The one or more side members, one or more cross bow members, or both may connect to the cargo box using one or more latches. The foldable tonneau system may be unitary (i.e., a single connected piece), or may consist of a plurality of tonneau sections. The foldable tonneau system may be structurally rigid. For example, the foldable tonneau system may be sufficiently rigid to prevent an object, such as a heavy stone, from damaging the foldable tonneau system and entering the cargo box. The foldable tonneau system may be flexible such that the one or more sections of the foldable tonneau system are movable while a portion of the foldable tonneau system remains stationary. The foldable tonneau system may comprise a uniform material, or may comprise a plurality of materials. For example, the foldable tonneau system may include metal side members and cross bow members, yet have plastic latches. Each component of the foldable tonneau system may be a single material, or may comprise a plurality of materials. The foldable tonneau system may include a cover.

The cover may function to prevent debris from entering the cargo box or other compartment of a vehicle, such as a pickup truck. The cover may be configured to protect the cargo box or other compartment from environmental degradation. The environmental degradation may be corrosion, rust, mold/mildew, or a combination thereof, caused by precipitation and other debris. The cover may be attached to one or more side members, one or more cross bow members, or a combination thereof. The cover may be attached by fasteners, adhesives, or a combination thereof. The fasteners may be screws, bolts, nuts, nails, press-fit clips/buttons, hooks, latches, or a combination thereof. The adhesives may be glue, expoxy, polyurethane, cyanoacrylate, or a combination thereof. The cover may be a flexible or a continuous piece. For example, the cover may be a fabric that is rolled across a frame create by one or more side members, one or more cross bow members, or both, and attached to the frame in an unrolled state. The cover may be structurally rigid such that the cover deflects objects from flexing or piercing the cover. The cover may be a fabric or may be metal. The cover may comprise a plurality of segments that make up the cover to form a cover attachment assembly. For example, the cover may include a plurality of individual sections that, when installed, are connected (e.g., fastened together) to form a unitary cover. The cover may include one or more seams. The cover may be free of seams. The cover may removably attach to the foldable tonneau system such that the cover may be replaced without uninstalling the foldable tonneau system. The cover may be secured to one or more side members such that the cover spans an entire opening of the cargo box.

The side members may function to create a peripheral frame for the foldable tonneau system. The side members may be configured to secure the foldable tonneau system to the cargo box, vehicle (i.e., a pickup truck), or both. The side members may be configured to support one or more cross bow members. The one or more cross bow members may span between one or more side members positioned on opposing sides of the cargo box. For example, one or more cross bow members may span between a first side member and a second side member such that the cross bow member is approximately the same width as the cargo box. Similarly, one or more cross bow members may span between one or more side members such that the cross bow members are approximately the same length as the cargo box. The side members may vary in length and width depending on the desired attachment shape. For example, a side member may have a length approximately equal to a length of the cargo box. Conversely, a length of the cargo box may require a plurality of side members of a shorter length to reach the total length of the cargo box. The side members may secure to one or more surfaces, one or more lips, one or more edges, or a combination thereof of the cargo box. The side members may be positioned substantially parallel to a perimeter shape of the cargo box. The side members may substantially follow the perimeter shape of the cargo box. For example, the cargo box may have a rectangular shape and the side members are attached along the perimeter of the cargo box to form a substantially similar rectangular shape (i.e., the side members form a frame that is directly over the perimeter of the cargo box). The side members may be secured to the cargo box using one or more fasteners such as screws, bolts, nails, rivets, clamps, latches, touch fastener, or a combination thereof. The side members may be secured to the cargo box using one or more adhesives such as glue, expoxy, polyurethane, cyanoacrylate, or a combination thereof. The side members may be made of metal, plastic, or both. The metal may be aluminum, copper, steel, iron, tin, bronze, or a combination thereof. The plastic may be polyamide, polycarbonate, polyester, polyethylene, polypropylene, polystyrene, polyurethane, polyvinyl, or a combination thereof. The side members may be solid or may be hollow. For example, the side members may have a hollow cross-section such that each side member has a plurality of walls. The side members may include one or more attachment points to connect to and/or receive a portion of one or more cross bow members. For example, the side members may include a receiving hole to receive a protruding peg of a cross bow member (e.g., the side member may have a key-hole slot to receive a button of the cross bow member), or vice versa. The side members may be connected to each other by one or more hinges such that one or more tonneau sections are adapted to fold onto one another. For example, a proximal end of a first side member may be attached by a hinge to a distal end of a second side member such that the first and second side members share a common longitudinal axis. A pair of side members as illustrated above may be positioned on opposing sidewalls of the cargo box to support opposing sides of a tonneau section and be configured to fold the tonneau section onto one or more additional tonneau sections. A pair of side members may secure one or more cross bow members spanning between the pair of side members.

The cross bow members may function to span across a length or width of the cargo box to support the foldable tonneau system. The cross bow members may be configured to attach to one or more side members to form an interior frame of the foldable tonneau system. The cross bow members may be configured to secure the foldable tonneau system to the cargo box, the vehicle, or both. The cross bow members may secure the foldable tonneau system to the cargo box, the vehicle, or both using one or more latch assemblies. For example, the cross bow members may connect to the cargo box by a plurality of latch assemblies creating a compression force between the cross bow members and the cargo box. The cross bow members may include one or more attachment points to connect to and/or receive a portion of one or more side members. The cross bow members may attach directly to one or more side members, one or more surfaces of the cargo box (i.e, one or more sidewalls, a tailgate, or both), or a combination thereof. The cross bow members may be positioned substantially perpendicular to one or more side members, one or more surfaces of the cargo box, or both. The cross bow members may be positioned at an angle other than substantially perpendicular relative to one or more side members, one or more surfaces of the cargo box, or both. The cross bow members and one or more side members, one or more surfaces, or both may create any angle. The angle may be about 50 degrees or more, about 60 degrees or more, about 70 degrees or more, or about 80 degrees or more. The angle may be about 130 degrees or less, about 120 degrees or less, about 110 degrees or less, or about 100 degrees of less. The cross bow members may have a shape substantially similar to one or more side members. The cross bow members may have a shape dissimilar to the side members. The cross bow members may include one or more supports for additional stiffness. For example, the cross bow members may include one or more legs that contact a bed of the cargo to substantially eliminate flex of the cross bow member near a midpoint of the cross bow member. The cross bow members may be made of metal, plastic, or both. The metal may be aluminum, copper, steel, iron, tin, bronze, or a combination thereof. The plastic may be polyamide, polycarbonate, polyester, polyethylene, polypropylene, polystyrene, polyurethane, polyvinyl, or a combination thereof. The cross bow members may have a composition similar to the side members or dissimilar. The cross bow members may be solid or may be hollow. For example, the cross bow members may have a hollow cross-section such that each cross bow member has a plurality of walls. The cross bow members may have one or more open sides. For example, the cross bow member may be hollow such that the cross bow member forms a "C" shaped structure. The cross bow member may be generally "U" shaped or generally "C" shaped. The cross bow member may have a structure including one or more inwardly turned flanges such that one or more latch assemblies rest on the one or more inwardly turned flanges.

The one or more inwardly turned flanges may function to support one or more latch assemblies. The one or more inwardly turned flanges may create a channel along a longitudinal axis of the cross bow members such that a latch assembly can freely slide from a proximal end to a distal end of the cross bow member while still engaging the cross bow member. The inwardly turned flanges may provide a leverage surface to create a compression force between the foldable tonneau system and the cargo box. For example, a latch assembly may be positioned in the channel of a cross bow member and, when the latch assembly is engaged to the cargo box, a head of the latch assembly creates a downward force on the inwardly turned flanges to compress the cross bow member and the cargo box. The inwardly turned flanges may create a channel sufficiently wide to allow a head of a latch assembly to be inserted and rotated to engage the cross bow member. The inwardly turned flanges may be symmetrically opposing surfaces or may be dissimilar. The inwardly turned flanges may project from one or more sides of the cross bow member at a substantially right angle. The inwardly turned flanges may project from one or more sides of the cross bow member at an angle other than a substantially right angle. The angle created between the inwardly turned flange and a surface of the cross bow member may be about 15 degrees or more, about 30 degrees or more, about 45 degrees or more, about 60 degrees or more, or about 75 degrees or more (about is ±3 degrees). The angle may be about 165 degrees or less, about 150 degrees or less, about 135 degrees or less, about 120 degrees or less, or about 105 degrees or less. The inwardly turned flanges may have a thickness equal to a wall thickness of the cross bow member. The inwardly turned flanges may have a thickness greater than or less than a wall thickness of the cross bow member. For example, the inwardly turned flanges may have a thickness of approximately about 10 mm thick while the cross bow member has a wall thickness of about 5 mm thick. The inwardly turned flanges may have a wall thickness of about 1 mm or more, about 2 mm or more, about 4 mm or more, about 8 mm or more, or about 16 mm or more. The inwardly turned flanges may have a wall thickness of about 32 mm or less, about 24 mm or less, or about 18 mm or less. The inwardly turned flanges may have substantially smooth surfaces to allow a head of a latch assembly to freely move along a longitudinal axis of the channel of the cross bow member. The smooth surfaces of the cross bow members may form a bearing surface. The smooth surface may include a lubricant to decrease friction between the latch assembly and the smooth surface. The lubricant may be grease, oil, silicone, any other friction decreasing material, or a combination thereof. The inwardly turned flanges may have a surface finish to decrease friction between the latch assembly and the smooth surface. For example, the inwardly turned flanges (or the entire cross bow member), may be zinc-plated or electrostatically coated to provide a surface free of contour or burrs. The inwardly turned flanges may allow insertion and removal of one or more latch assemblies without disassembling the foldable tonneau system.

The latch assembly may function to secure the foldable tonneau system to the cargo box. The latch assembly may be configured to attach one or more cross bow members to one or more sidewalls of the cargo box. The latch assembly may secure the foldable tonneau system to the cargo box by attaching the one or more cross bow members to the one or more sidewalls of the cargo box. For example, the side members, cover, or both may be connected to the cross bow members being attached to the cargo box, resulting in the foldable tonneau system being secured to the cargo box. The latch assembly may include a head that is inserted into a hollow cavity of the one or more cross bow members and rest along the inwardly turned flanges. The latch assembly may be removably inserted into the cross bow members so that the latch assembly may be removed from the cross bow member without removing (i.e. uninstalling) the cross bow member from one or more side members, one or more additional cross bow members, other components of the foldable tonneau system, or a combination thereof. For example, a latch assembly secured in a cross bow member may be replaced if broken while opposing side members and the crossbow member spanned between the opposing side members remain secured to the cargo box of the vehicle. The latch assembly may vary in structure to accommodate fluctuating attachment surfaces on the cargo box. For example, the latch assembly may be a front latch assembly in which a slidable catch engages a sidewall of the cargo box, and is secured using a corresponding fastener of the front latch assembly. Alternatively, the latch assembly may be a rear latch assembly in which a slidable catch engages a sidewall of the cargo box, and is secured using an internal biasing member of the rear latch assembly. The latch assembly may comprise a plurality of individual components that, once assembled, created the latch assembly. For example, the latch assembly may include a trunnion assembly, handle assembly, locking clips, head, or a combination thereof. The components of the latch assembly may be made from similar materials or dissimilar materials. For example, the head of the latch assembly may be an injection-molded plastic, while the trunnion assembly is stainless steel. The latch assembly may be adapted to freely move along a longitudinal axis of the cross bow member while inserted into a cross sectional area of the cross bow member. The latch assembly may be pivotable relative to the cross bow member. For example, a handle portion of the latch assembly may rotate about an axis of a trunnion assembly while a head of the latch assembly remains stationary and engaged in the cross bow member. The latch assembly may be stowable within a channel of the cross bow member while not in use. For example, the latch assembly may be stowed in a channel of the cross bow member so that a first tonneau section may be folded onto a second tonneau section without removing the latch assembly. The latch assembly may include a head to provide users an efficient method of installing and uninstalling the latch assembly.

The head may function to removably insert within a channel of a cross bow member without uninstalling the cross bow member from the foldable tonneau system. The head may slidably engage inwardly turned flanges of the cross bow member to allow the latch assembly to freely move along a longitudinal axis of the cross bow member while being retained in a cross-sectional area of the cross bow member. For example, once the head is inserted into a cross-sectional area of the cross bow member and engages the inwardly turned flanges, the head may freely move within the cross-sectional area, yet be prevented from being removed from the cross-sectional area. A surface of the head (i.e., a bottom surface) may rest along a smooth interior surface of the inwardly turned flanges to allow sliding of the latch assembly relative to the cross bow member. The head may be rotatable relative to the cross bow member while engaged in a channel of the cross bow member. For example, the head of the latch assembly may be inserted in a cross-sectional area of the cross bow member in an unlocked position so that a length of the head is substantially perpendicular to a width of the cross bow member and a width of the head is narrow enough to be inserted into the cross-sectional area. The head may then be rotated within the cross-sectional area from the unlocked position to a locked position so that the length of the head is substantially parallel to the width of the cross bow member. The length of the head is greater than the span of the gap between the inwardly turned flanges so that the head rests upon an interior surface of the inwardly turned flanges. The head may be a unitary piece, or more include one or more individual components. For example, the head may be a single injection-molded piece. Alternatively, the head may have an injection-molded locking portion and one or more receiving portions attached to the locking portion. The cross bow member may be adapted to receive a locking portion of the head.

The locking portion may function to allow a user to removably insert the head into a cross-sectional area of the cross bow member. The locking portion may be configured to allow the head of the latch assembly to rotate from an unlocked position (i.e., when a length of the head is substantially perpendicular to the width of the cross bow member), to a locked position (i.e., when the length of the head is substantially parallel to the width of the cross bow member). The locking portion may be inserted into the cross-sectional area of the cross bow member between the inwardly turned flanges (i.e., the longitudinal channel of the cross bow member). For example, the length of the head may be less than a width of the cross-sectional area, yet be greater than a width of a gap between the inwardly turned flanges. Similarly, the width of the head may be less than both a width of the cross-sectional area and a gap between the inwardly turned flanges so that the head may be inserted into the cross-sectional area via the gap between the inwardly turned flanges. The locking portion may be compressible so that the head of the latch assembly can be compressed to fit within a gap between the inwardly turned flanges. The locking portion may be structurally rigid. The locking portion may be expandable once inserted into the cross-sectional area of the cross bow member. For example, the locking portion may start in a collapsible state so that, once inserted into the cross bow member, the locking portion is expanded using one or more internal arms to reach a length greater than a width of the gap between the inwardly turned flanges. The locking portion may include one or more fillets, one or more corners, or a combination thereof to allow for rotation of the locking portion.

The one or more fillets may function to allow rotation of the locking portion when abutted to an interior wall of the cross-sectional area of the cross bow member. The fillets may function to permit the head to rotate from an unlocked position to a locked position when the head is located within the cross-sectional area of the cross bow member. For example, the fillets may permit the head to rotate within the cross-sectional area of the cross bow member free of obstruction from one or more interior walls of the cross bow member. The fillets may be located on opposing sides of the head relative to each other so that a first fillet engages a first interior wall of the cross bow member and a second fillet engages a second interior wall of the cross bow member. The fillets may have the same radius or different radii. The radius may be about 5 mm or more, about 10 mm or more, about 15 mm or more, about 20 mm or more, about 25 mm or more, about 30 mm or more, about 35 mm or more, about 40 mm or more, about 45 mm or more, or about 55 mm or more. The radius may be about 100 mm or less, about 95 mm or less, about 90 mm or less, about 85 mm or less, about 80 mm or less, about 75 mm or less, about 70 mm or less, about 65 mm or less, about 60 mm or less, or about 55 mm or less (i.e., about is ±2 mm). The fillets may be smooth to allow rotation of the head while engaging the interior walls of the cross-sectional area. The head may include one or more fillets. The head may include two or more fillets. The head may include three or more fillets. The head may include four or more fillets. The head may include 10 or less fillets, 9 or less fillets, 8 or less fillets, 7 or less fillets, 6 or less fillets, or 5 or less fillets. The fillets may be an integral piece of the head or may be an attached secondary component. For example, the fillets may be cut directly into a molded head piece. Alternatively, the fillets may be a secondary piece adhered to a core head piece to create a sufficient head perimeter to permit rotation within the cross-sectional area of the cross bow member. A bottom surface of the one or more fillets may rest on an interior surface of the inwardly turned flanges. The one or more fillets may be connected by one or more sidewalls of the head.

The sidewalls of the head may function to form a perimeter of the head. The sidewalls may be substantially straight or may include one or more curves. The sidewalls may extend between the one or more fillets, one or more corners, or both to create a peripheral shape of the locking portion of the head. For example, the sidewalls may connect two fillets to two corners to form a substantially tear-drop shaped locking portion. The sidewalls may be integrally formed with the locking portion, the one or more fillets, the one or more corners, or a combination thereof. The sidewalls may be collapsible, having one or more sub-components that are adapted to fold onto each other to maintain a collapsed size of the head. The sidewalls may be structurally rigid. The sidewalls may be compressible. The sidewalls may be an extension of the one or more corners, one or more fillets, or both (i.e., the sidewalls are integrally formed with the one or more corners, one or more fillets, or both). The sidewalls may create a transitional surface between one or more fillets and one or more corners so that the locking portion may abut interior walls of the cross bow member, and be adapted to rotate along the one or more fillets and sidewalls to reach the one or more corners.

The one or more corners may function to secure the locking portion in the cross-sectional area of the cross bow member. The one or more corners may dictate a rotational direction of the locking portion once inserted into the cross bow member. For example, the one or more corners may allow a clockwise rotation of the locking portion inside the cross bow member and prevent a counterclockwise rotation. Alternatively, the one or more corners may allow a counterclockwise rotation and prevent a clockwise rotation. The corners may allow rotation both clockwise and counterclockwise. The corners may be interconnected to the one or more sidewalls, fillets, or both. A plurality of sidewalls may form the corners. For example, a first sidewall and a second sidewall may meet at a terminal end to form an angle of a corner. The corners may have an angle that is a substantially right angle (i.e. a 90 degree angle). The corners may have an angle other than a substantially right angle. The angle created between a first and second edge of the corners may be about 30 degrees or more, about 45 degrees or more, about 60 degrees or more, or about 75 degrees or more. The angle may be about 150 degrees or less, about 135 degrees or less, about 120 degrees or less, or about 105 degrees or less. The corners may all have the same angle. Each of the corners may have different angles. The corners may be sufficiently rigid to maintain an angle. The corners may be movable to adjust the angle of the corners. For example a first edge and a second edge may be pivotable relative to each other about a joint to alter the angle between the first edge and the second edge. A bottom surface of the one or more fillets may rest on an interior surface of the inwardly turned flanges. The corners may be positioned on the locking portion so that, once rotated inside the cross-sectional area of the cross bow member, the corners engage the interior walls of the cross bow member and prevent further rotation of the locking portion. The corners may help secure the locking portion in the cross-sectional area of the cross bow member so that a receiving portion of the head protrudes from the cross bow member.

The receiving portion may function to connect the head to a trunnion assembly, handle assembly, or both. The receiving portion may project substantially perpendicular to a bottom surface of the locking portion. The receiving portion may project from the locking portion at an angle other than substantially perpendicular. The receiving portion may be integrally formed with the locking portion (i.e., the head of the latch assembly is a unitary piece). The receiving portion may protrude from the cross-bow member when the locking portion is inserted into the cross-sectional area of the cross bow member. The receiving portion may protrude through a gap between the inwardly turned flanges of the cross bow member to connect the head to a body of the latch assembly (i.e., the handle assembly, trunnion assembly, or both). The receiving portion may be structurally rigid. The receiving portion may include one or more individual protrusions extending from the locking portion. The receiving portion may have one or more protrusions, two or more protrusions, three or more protrusions, or four or more protrusions. The receiving portions may have ten or less protrusions, eight or less protrusions, or six or less protrusions. The receiving portion may be flexible so that the receiving portion can move relative to the locking portion. The receiving portion may include one or more receiving holes along one or more walls of the receiving portion.

The receiving holes may function to receive a trunnion assembly. The receiving portions may function to facilitate pivoting of a portion of the latch assembly relative to the head. For example, once inserted into the cross bow member, the head of the latch assembly may remain stationary while a handle assembly pivots about an axis of a trunnion assembly secured in the receiving holes. The receiving holes may extend through a portion of the receiving portion. The receiving holes may extend through the receiving portion to form one or more bore holes (i.e., the holes extend through an entire thickness of the receiving portion). The receiving holes may vary in shape and dimension. The receiving holes may be circular, ovular, rectangular, square, trapezoidal, triangular, or a combination thereof. The receiving holes may include a lubricant to aid in rotation of a trunnion assembly inserted into the receiving holes. The receiving holes may include an adhesive to fixedly secure a trunnion assembly or other component of the latch assembly. A plurality of receiving holes may be positioned to along a common axis so that a trunnion assembly remains substantially parallel relative to the locking portion once inserted. The receiving holes may be located on opposing protrusions of the receiving portion having a notch between the receiving portions.

The notch may function to receive a portion of the latch assembly in a stowable position. The notch may be configured to allow pivoting of the handle assembly relative to the head. The notch may be adapted to receive a threaded member of the latch assembly in the stowable position. For example, while the latch assembly is inserted into the cross bow member, the handle assembly is pivoted relative to the head so that the handle assembly is substantially parallel to the cross bow member to allow the handle assembly to be secured to the cross bow member. The notch may be formed between two or more protrusions of the receiving portion. The notch may allow a degree of rotation of the handle assembly relative to the head of the latch assembly. The notch may allow pivotal movement of about 45 degrees or more, about 60 degrees or more, about 75 degrees or more, or about 90 degrees or more. The notch may allow a pivotal movement of about 150 degrees or less, about 135 degrees or less, about 120 degrees or less, or about 105 degrees or less. A trunnion assembly may be secured by receiving holes in opposing protrusions of the receiving portion so that the trunnion assembly spans a width of the notch.

The trunnion assembly may function to allow pivoting of a handle assembly of the latch assembly relative to the head. The trunnion assembly may be inserted into one or more receiving holes. For example, a first trunnion end of the trunnion assembly may be inserted into a first receiving hole and a second trunnion end of the trunnion assembly may be inserted into a second receiving hole to allow rotational movement of the trunnion assembly inside the receiving holes. The trunnion assembly may be substantially cylindrical to match a circular shape of the receiving holes. The trunnion assembly may be made of metal, plastic, or both. The metal may be stainless steel, iron, copper, or a combination thereof. The plastic may be polyamide, polycarbonate, polyester, polyethylene, polypropylene, polystyrene, polyurethane, polyvinyl, or a combination thereof. The trunnion assembly may have one or more surface protection layers to prevent environmental degradation. For example, the trunnion assembly may have an electrostatic coating, zinc plating, or other anti-corrosion coating. The trunnion assembly may include one or more trunnion receiving holes in a main body of the trunnion assembly (i.e., a portion of the trunnion assembly between two opposing trunnion ends). The receiving hole of the trunnion assembly may receive a threaded member connected to the handle assembly of the latch assembly.

The threaded member may function to pivot about an axis of the trunnion assembly. The threaded member may function to connect the head to a handle assembly. The threaded member may be received by the trunnion receiving hole. For example, the threaded member may be threaded into a corresponding interior threading of the trunnion receiving hole to secure the threaded member. The threaded member may have a threading along a portion of a length of the threaded member. The threaded member may be threaded along the entire length of the member. The threading may vary in spacing and pitch (i.e., the number of threads may vary). The threaded member may be substantially cylindrical. The threaded member may be rectangular. The threaded member may be shaped substantially like a rod. The threaded member may vary in length. For example, the threaded member may be about 10 mm long, about 20 mm long, about 30 mm long, about 40 mm, about 50 mm long, about 60 mm long, about 70 mm long, about 80 mm long, about 90 mm long, or about 100 mm long. The threaded member may have one or more surface finishes to prevent degradation of the threaded member. The surface finish may be one or more anti-corrosion finishes, such as zinc plating or electrostatic plating. The threaded member may be threaded on a proximal end and a distal end, yet be free of threading between the proximal end and the distal end. The threaded member may connect to a handle assembly, slidable catch, corresponding fastener, or a combination thereof. The threaded member may be attached to a component on both a proximal end and a distal end. For example, the threaded member may be received by the trunnion receiving hole on a first end and received by a corresponding fastener on a second end. The threaded member may be rigid. The threaded member may be flexible so that only a portion of the threaded member pivots relative to the head. The threaded member may have a diameter less than a width of the gap between the inwardly turned flanges.

The threaded member may have an exterior member that functions to protect the threaded member from environmental degradation. For example, the threaded member may include an exterior sleeve that covers a portion of the threaded member that would otherwise be exposed to natural elements such as rain or debris. The member may vary in length to accommodate a varying length of the threaded member. The member may be made of rubber, plastic, metal, vinyl, fabric, or a combination thereof. The diameter of the member may be less than a width of the gap between the inwardly turned flanges. The member may protect a portion of the threaded member between the head of the latch assembly and a slidable catch.

The slidable catch may function to secure the latch assembly to one or more sidewalls of the cargo box. The slidable catch may be configured to freely move along a longitudinal axis of the threaded member. The slidable catch may be free to rotate about the longitudinal axis of the threaded member. For example, the slidable catch may include an aperture (i.e., a hole) extending through a thickness of the slidable catch so that the threaded member may extend through the aperture of the slidable catch. The slidable catch may be fixedly attached to the threaded member. The slidable catch may secure to a portion of the cargo box other than the sidewalls. For example, the slidable catch may attach to a tailgate of the cargo box. The slidable catch may create a compression force between the foldable tonneau system and the cargo box. For example, the slidable catch may be positioned to engage a sidewall of the cargo box and a corresponding fastener may tighten the slidable catch by moving the slidable catch along the threaded member, thereby decreasing the distance between the head and the slidable catch. The slidable catch may include an engaging portion that engages the one or more sidewalls of the cargo box.

The engaging portion may function to engage a lip or thickness of the one or more sidewalls of the cargo box. The engaging portion may attach to a tailgate of the cargo box. The engaging portion may be substantially shaped like a hook to wrap-around a thickness of the one or more sidewalls (i.e., catch the sidewall). The engaging portion may be integrally formed with the slidable catch. For example, the engaging portion and aperture may be a unitary injection-molded piece. The engaging portion may be structurally rigid or may be flexible. The engaging portion may be a separate piece attached to the slidable catch. The engaging portion may extend substantially perpendicular to a longitudinal axis of the handle assembly. The engaging portion may be substantially parallel to the longitudinal axis of the handle assembly. For example, the engaging portion may be a clip positioned parallel to the longitudinal axis of the handle assembly to engage a lip of one or more sidewalls of the cargo box. The engaging portion may include one or more latches, friction surfaces (i.e., surfaces to decrease potential slippage between the engaging portion and the cargo box), biasing members, recesses, protrusions, hooks, fasteners, or a combination thereof. The engaging portion may remain in a position to engage the one or more sidewalls by a corresponding fastener.

The corresponding fastener may function to adjust a compression force when the engaging portion is secured to the cargo box. The corresponding fastener may function to maintain a position of the slidable catch along a longitudinal axis of the threaded member. The corresponding fastener may secure to one or more ends of the threaded member. The corresponding fastener may include one or more receiving holes to receive the one or more ends of the threaded member. The corresponding fastener may have an internal threading that mates with a threading of the threaded member. For example, the corresponding fastener may be rotated to tighten the corresponding fastener around the threading of the threaded member. The corresponding fastener may include a handle portion for a user to easily rotate the corresponding fastener. The corresponding fastener may prevent the slidable catch, member, or both from accidentally falling off the threaded member. The corresponding fastener may create a compression force between the slidable catch and the foldable tonneau system. For example, once the slidable catch is engaged to the sidewall, the corresponding fastener may be rotated to tighten the corresponding fastener, resulting in slidable catch clamping the sidewall. The clamping action results in the head of the latch assembly compressing the engaged cross bow member (and thus the entire foldable tonneau system) towards the cargo box. The corresponding fastener may be rotated clockwise or counterclockwise to tighten. The corresponding fastener may be rotated clockwise or counterclockwise to loosen (i.e., disengage to slidable catch from the sidewall). The corresponding fastener may have a tightening mechanism other than a rotatable threading. For example, the corresponding fastener may include a lever to decrease the distance between the head and the slidable catch (i.e., create the compression force). The corresponding fastener may be free of threading. The corresponding fastener may attach to the threaded member using a press-fit mechanism. The corresponding fastener and slidable catch may be used to secure the foldable tonneau system, or alternatively a handle assembly may be used.

The handle assembly may function to engage a lip or thickness of the one or more sidewalls of the cargo box. The handle assembly may attach to a tailgate of the cargo box. The hand assembly may attach to another portion of the vehicle, such as the body of a pickup truck. The handle assembly may be directly or indirectly connected to the head of the latch assembly. For example, the handle assembly may be indirectly connected to the head via the threaded member. The handle assembly may freely move along the longitudinal axis of the threaded member. The handle assembly may be free to rotate relative to the longitudinal axis of the threaded member. The handle assembly may pivot relative to the head of the latch assembly. For example, once the head is secured in a cross bow member, the handle assembly may pivot about the head (e.g., about an axis of a trunnion assembly attached to the head) while the head remains stationary. The handle assembly may pivot about the head via the threaded member. The threaded member may extend through an internal central cavity of the handle assembly. For example, the handle assembly may include a central bore that allows the threaded member to extend from a proximal end of the handle assembly, through a length of the handle assembly, and protrude from an opposing distal end of the handle assembly. The handle assembly may be threaded onto the threaded member. The handle assembly may include an internal threading within a receiving hole to receive a corresponding threading of the threaded member. The handle assembly may be free of threading. The handle assembly may be fixedly attached to the threaded member. The handle assembly may include one or more engaging portions to engage one or more sidewalls of the cargo box. The handle assembly may include one or more biasing members within a cavity of the handle assembly to bias the one or more engaging portions. The handle assembly may include one or more locking clips to secure the latch assembly in a collapsible state (i.e., when the latch assembly is folded upon the cross bow member. The handle assembly may include a handle portion.

The handle portion may function to form a housing around the biasing member, threaded member, member, a retaining nut, or a combination thereof. The handle portion may be an integral portion of the handle assembly (e.g., the handle assembly may be an injection-molded piece comprising the handle portion). The handle portion may be structurally rigid to support compression between the engaging portion and the foldable tonneau system. The handle portion may be flexible. The handle portion may have one or more cavities. For example, the handle portion may be an integral piece of the handle assembly so that the central bore of the handle assembly extends through the handle portion. The handle portion may be substantially symmetrical in shape. The handle portion may have a plurality of contoured surfaces. The contoured surfaces may be similar or dissimilar in flatness. The handle portion may extend between an engaging portion and a gripping portion.

The gripping portion may function to provide a user a grip to position the latch assembly in a desired position. The gripping portion may be configured so that a user may adjust a position of the handle assembly along the longitudinal axis of the threaded member. The gripping portion may include one or more projections to provide additional gripping strength for a user. The gripping portion may include one or more abrasives, adhesives, friction modifiers, or a combination thereof to increase friction between a user's hand and the gripping portion. The gripping portion may have contoured portions to provide an uneven surface and prevent slipping of a user's hand. For example, the gripping portion may include a concave surface shaped to receive one or more fingers, palm, or both of a user. The gripping portion may include one or more straps, one or more hooks, one or more rings, one or more loops, one or more lips, or a combination thereof, to provide additional grip support for the user. The gripping portion may be positioned adjacent to one or more locking clips.

The one or more locking clips may function to secure the handle assembly between the inwardly turned flanges of the cross bow member while in a stowable position. The locking clips may engage one or more of the inwardly turned flanges while in the stowable position. The locking clips may create a press-fit condition with the inwardly turned flanges. For example, the locking clips may compress when contacting the inwardly turned flanges so that the handle assembly remains stationary when stowed. The locking clips may secure the handle assembly to a part of the cross bow member other than the inwardly turned flanges. The one or more locking clips may be a plurality of locking clips. The latch assembly may include two or more locking clips, three or more locking clips, four or more locking clips, or five or more locking clips. The one or more locking clips may be integrally formed with the gripping portion, the handle portion, the engaging portion, or a combination thereof. The locking clips may be fixedly attached to the handle assembly or removably attached. The locking clips may include a cantilever portion to engage the cross bow member.

The cantilever portion may function to flexibly attach to the locking clip at a first end so that a second end of the cantilever portion may compress when force is applied to the cantilever portion. The cantilever portion may be elastic. For example, the cantilever portion may flex inwardly when force is applied and return to a first position when the force is alleviated. The cantilever portion may be inelastic. For example, the cantilever portion may be structurally rigid and pivot relative to a bearing located at a fixed point connecting the cantilever portion and the gripping portion. The cantilever portion may vary in size and shape. The cantilever portion may be integrally formed with one or more projections of the gripping portion. The cantilever portion may be positioned substantially perpendicular to a longitudinal axis of the handle assembly. The cantilever portion may be positioned substantially parallel to the longitudinal axis of the handle assembly. The cantilever portion may be positioned substantially perpendicular to a longitudinal axis of a cross bow member while the handle positon is in a stowable position. The cantilever portion may be integrally formed with one or more projections of the gripping portion. The cantilever portion may be formed with the same material of the handle assembly or may be formed using a different material. The cantilever portion may include one or more locking features that are shaped to engage one or more portions of the cross bow member.

The one or more locking features may function to engage the cross bow member and secure the handle assembly in the stowable position. The locking features may engage the inwardly turned flanges of the cross bow member. The locking features may include one or more projections, one or more recesses, or both to engage the cross bow member. For example, the locking features may include a projection to engage the inwardly turned flanges in a press-fit condition. The projection may be compressed with the cantilever portion when force is applied between the locking feature and the inwardly turned flange. Once the locking feature is positioned past the inwardly turned flange and within a cross sectional area of the cross bow, the cantilever portion returns to a first position where the locking feature contains the handle assembly in the stowable position. Alternatively, the locking features may include one or more recesses so that the inwardly turned flanges are received by the one or more recesses to contain the handle assembly in the stowable position. The locking features may be integrally formed with the gripping portion, the one or more locking clips, the cantilever portion, or a combination thereof. The locking features may be compressible or may be structurally rigid. The locking features may be separate components that are fastened to the gripping portion, the one or more locking clips, the cantilever portion, or a combination thereof. The locking features may be substantially flat with an exterior surface of the gripping portion, the one or more locking clips, the cantilever portion, or a combination thereof. For example, the locking features may be a friction surface such as adhesive, silicone, rubber, or other abrasive to increase friction between the locking features and one or more surfaces of the cross bow member. The locking features may be adjustable to secure the handle assembly in a plurality of positions. For example, the locking features may be movable to engage the cross bow member in a stowable position and engage a secondary member in an expanded position. The locking features may be located on the gripping portion of the handle and be substantially perpendicular to a biasing member located within a cavity of handle assembly.

The biasing member may function to bias a position of the handle assembly, the gripping portion, the handle portion, or a combination thereof. The biasing member may bias the handle assembly relative to the head of the latch assembly. The biasing member may provide a compression force between the latch assembly and the foldable tonneau system. For example, the engaging portion may be secured to a sidewall of the cargo box and the biasing member may bias the engaging portion towards the head of the latch assembly secured in the cross bow member, resulting in a compression force between the engaging portion and the foldable tonneau system. The biasing member may be a spring, coil, band, foam, other type of elastic mechanism, or a combination thereof. The biasing member may be positioned within a cavity of the handle assembly. For example, the biasing member may be located in an interior cross sectional area of the handle assembly (e.g., within the central bore) and be positioned to surround the threaded member. The biasing member may be secured to the handle assembly, head, threaded member, or a combination thereof. The biasing member may be free of attachments to the handle assembly, head, threaded member, or a combination thereof. For example, the biasing member may surround the threaded member and rest on a retaining nut secured to an end of the threaded member so that the biasing member is free to move along a longitudinal axis of the threaded member and handle assembly.

The retaining nut may function to maintain a position of the biasing member. The retaining nut may be configured to secure a position of the handle assembly directly or indirectly related to the position of the biasing member. The retaining nut may be secured to an end of the threaded member. For example, the retaining nut may be threaded onto a proximal end of the threaded member relative to the head of the latch assembly. The retaining nut may be secured to a position along a length of the threaded member other than an end. For example, the retaining nut may be secured substantially near a midpoint along the length of the threaded member. The retaining nut may include a threaded opening to receive the threaded member. The retaining nut may be free of a threaded opening. For example, the retaining nut may be welded, glued, or otherwise bonded to an end of the threaded member and be free of engaging the threading. The retaining nut may include a flange so position the biasing member, the handle assembly, or both. For example, an end of the biasing member may rest on a surface of the flange so that the biasing member may be compressed when a user pulls the handle assembly away from the head of the latch assembly. The retaining nut may be metal, plastic, or both. The retaining nut may have a surface finish to protect from environmental degradation. The surface finish may be zinc plating, electrostatic coating, other anti-corrosion surface plating, or a combination thereof. The retaining nut may have a diameter larger than a diameter of the threaded member, biasing member, handle assembly, or a combination thereof. For example, the retaining nut may have a diameter larger than the threaded member and retaining member, but smaller than the handle assembly so that the retaining nut may be positioned within an interior cross sectional area (e.g., central bore) of the handle assembly.

Turning now to the figures, FIG. 1 illustrates a perspective view of a pickup truck 100 having a foldable tonneau system 12. The pickup truck 100 includes a cargo box 102 and a passenger cabin 104. The cargo box 102 includes a front wall (not shown), a left sidewall 108, a right sidewall 110, and a rear wall or tailgate 112. The left sidewall 108 and the right sidewall 110 of the pickup truck 100 are symmetrically opposite to each other. The foldable tonneau system 12 includes a cover 14 with a plurality of tonneau sections 16. The foldable tonneau system 12 includes a front tonneau section 16a, middle tonneau section 16b, and rear tonneau section 16n. While only three tonneau sections 16 are shown, it should be noted that the foldable tonneau system 12 is adapted to include more or less than three tonneau sections 16. Each of the plurality of tonneau sections 16a-16n includes cross bow members 28 extended between, and connected to, opposing side members 22. The side members 22 are retained to the cargo box 102 by a plurality of latch assemblies (not shown). The cover 14 is connected to each of the cross bow members 28 by a cover attachment assembly (not shown).

Figure 2:
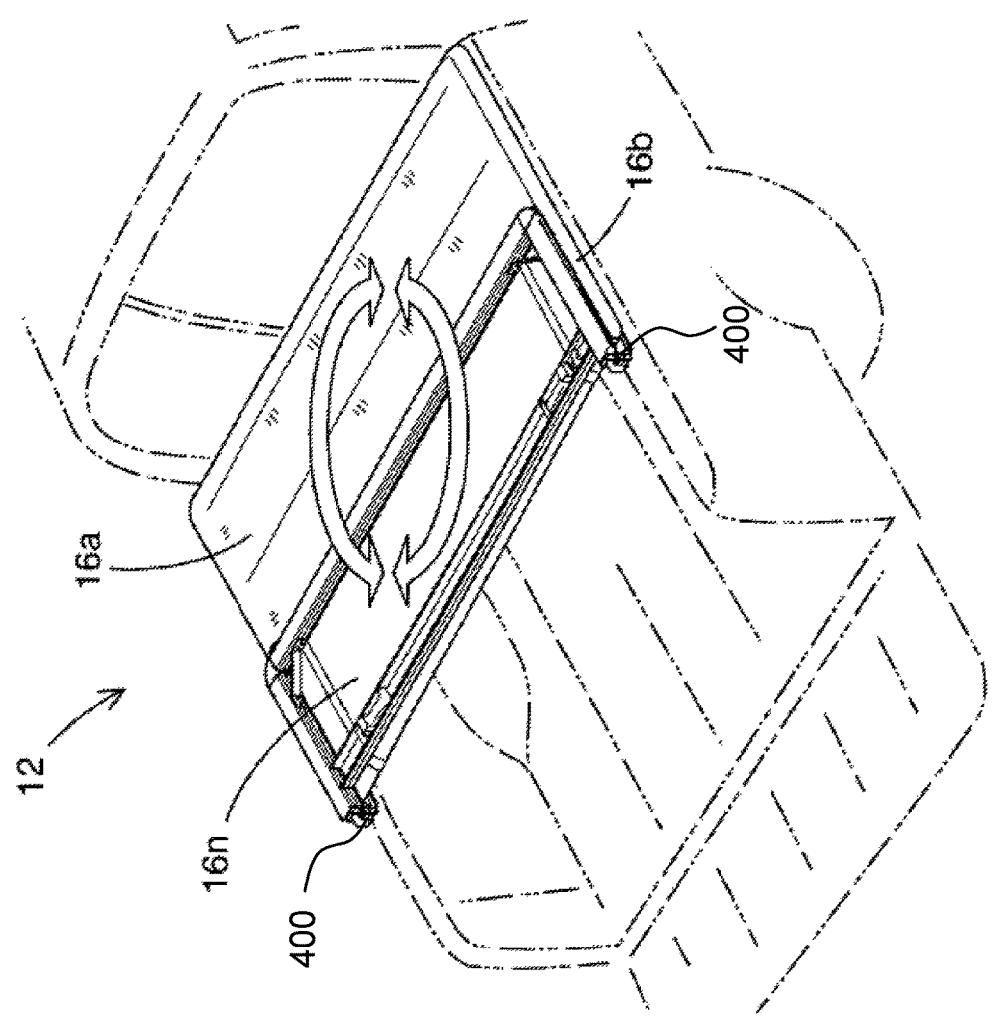
FIG. 2 is a perspective view of a foldable tonneau cover with a rear tonneau section folded upon a middle tonneau section.

FIG. 2 illustrates a perspective view of a foldable tonneau system 12 with a rear tonneau section 16n folded upon a middle tonneau section 16b using a pair of dual linkage hinge assemblies 400 attached on each side of the foldable tonneau system 12. The rear tonneau section 16n and the middle tonneau section 16b together can be folded onto a front tonneau section 16a using an additional pair of dual linkage hinge assemblies (not shown).

Figure 3:
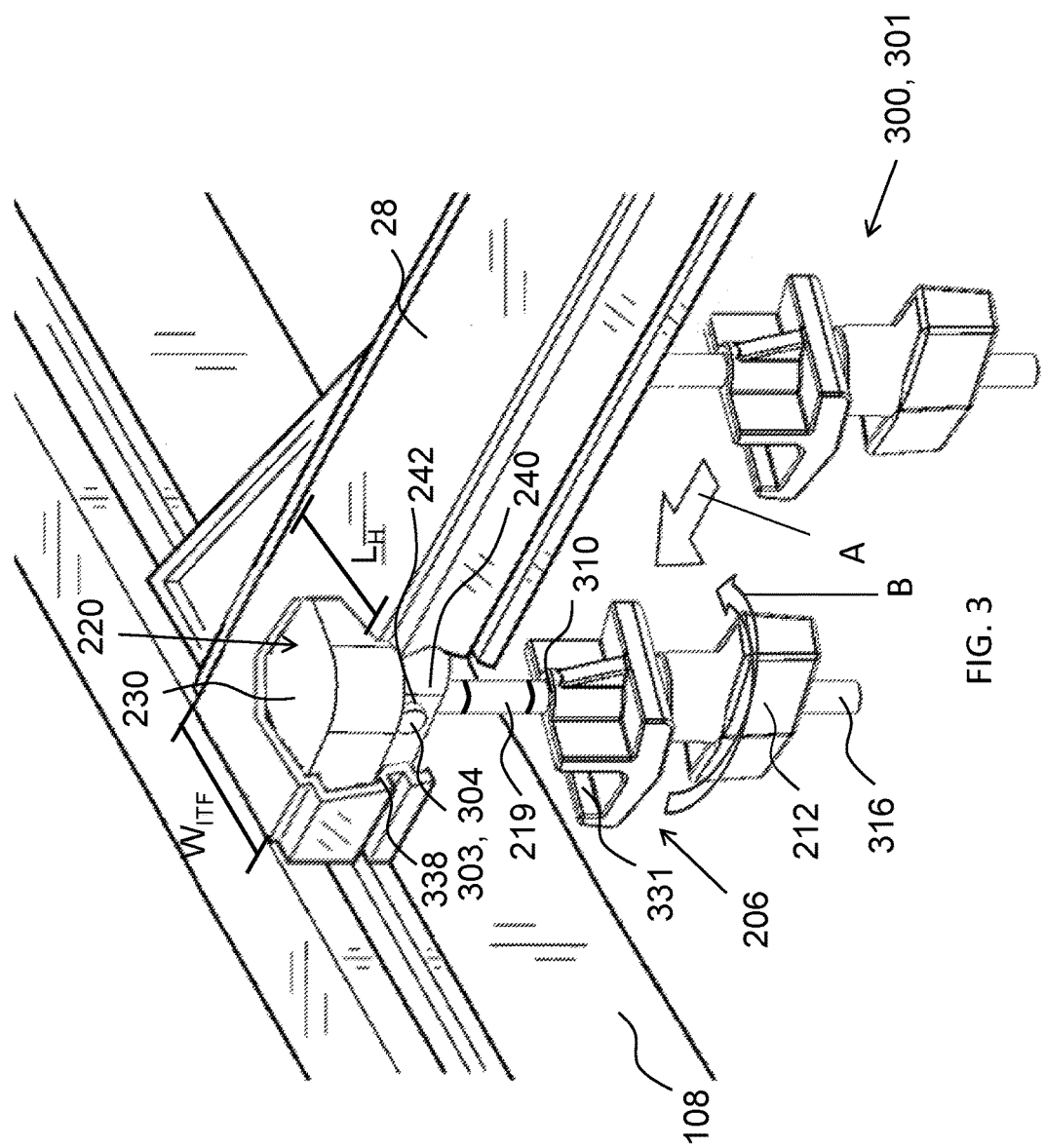
FIG. 3 is an enlarged perspective view of a front latch assembly secured in a cross member of a tonneau section.

FIG. 3 illustrates an enlarged perspective view of a latch assembly 300 that is a front latch assembly 301 engaging a left sidewall 108 of a cargo box of a pickup truck (as shown in FIG. 1). A head 220 of the front latch assembly 301 is inserted and secured on inwardly turned flanges 338 of a cross bow member 28, allowing the front latch assembly 301 to slide along a longitudinal axis of the cross bow member 28 as is shown by the arrow (A) demonstrating movement of the latch assembly 300 between two positions. To secure the head 220 to the cross bow member 28, a locking portion 230 of the head 220 is inserted into the cross bow member 28 and rotated approximately 90 degrees, as is indicated by the arrow (B), so that a length ($L_H$) of the locking portion 230 is greater than a width ($W_{ITF}$) of the span between the inwardly turned flanges 338 of the cross bow member 28. The head 220 further includes a plurality of receiving portions 240 projecting substantially perpendicular to a bottom surface of the locking portion 230. The plurality of receiving portions 240 each include a receiving hole 242 to receive and secure a trunnion assembly 303. The trunnion assembly 303 is inserted into the receiving holes 242 so that trunnion ends 304 are secured in the receiving holes 242. A first end of a threaded member 316 is threaded into the trunnion assembly 303. An opposing second end of the threaded member 316 extends through a slidable catch 206 and is threaded into a corresponding fastener 212. An aperture 310 of the slidable catch 206 allows the slidable catch 206 to move along a longitudinal axis of the threaded member 316. To secure the cross bow member 28 to the left sidewall 108, the front latch assembly 301 is slid along the inwardly turned flanges 338 of the cross bow member 28 in the direction (A) until an engaging portion 331 of the slidable catch 206 is positioned around a bottom edge of the left sidewall 108. Once the slidable catch 206 is positioned, the corresponding fastener 212 is fastened to tighten the slidable catch 206 in place, secured to the left sidewall 108. A member 219 is secured around an exposed portion of the threaded member 316 to protect from environmental or other degradation.

Figure 4:
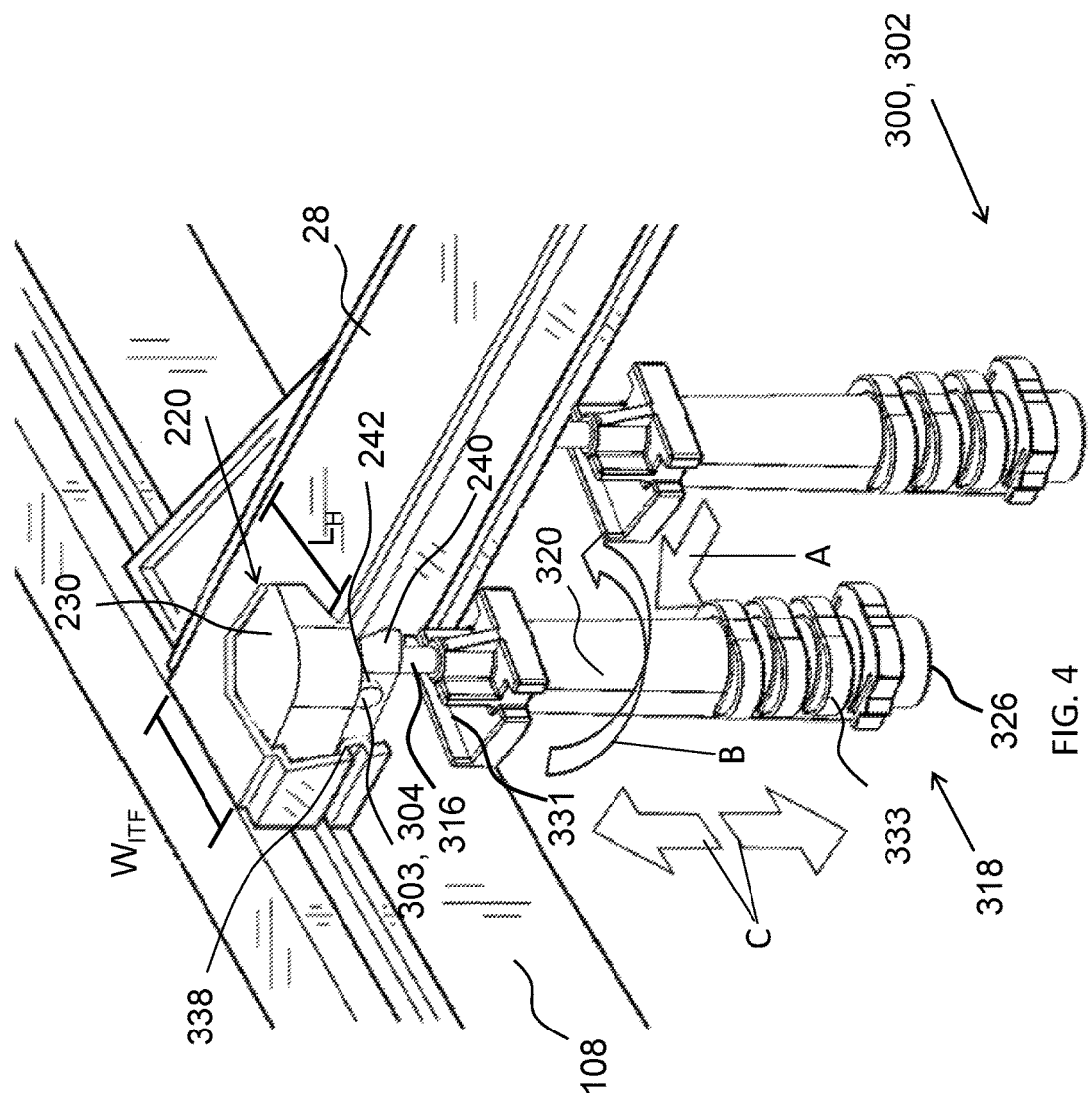
FIG. 4 is an enlarged perspective view of a rear latch assembly secured in a cross member of a tonneau section.

FIG. 4 illustrates an enlarged perspective view of a latch assembly 300 that is a rear latch assembly 302 moving in the direction (A) towards the left sidewall 108 and being vertically movable in the direction (C) to engage a left sidewall 108 of a cargo box of a pickup truck (as shown in FIG. 1). A head 220 of the rear latch assembly 302 is inserted and secured on inwardly turned flanges 338 of a cross bow member 28, allowing the rear latch assembly 302 to slide along a longitudinal axis, as shown by arrow (A), of the cross bow member 28. To secure the head 220 to the cross bow member 28, a locking portion 230 of the head 220 is inserted into the cross bow member 28 and rotated approximately 90 degrees, in the direction indicated by arrow (B), so that a length ($L_H$) of the locking portion 230 is greater than a width ($W_{ITF}$) of the span between the inwardly turned flanges 338 of the cross bow member 28. The head 220 further includes a plurality of receiving portions 240 projecting substantially perpendicular to a bottom surface of the locking portion 230. The plurality of receiving portions 240 each include a receiving hole 242 to receive and secure a trunnion assembly 303. The trunnion assembly 303 is inserted into the receiving holes 242 so that trunnion ends 304 are secured in the receiving holes 242. A first end of a threaded member 316 is threaded into the trunnion assembly 303. An opposing second end of the threaded member 316 extends through a central bore 326 of a handle assembly 318 and is threaded into a retaining nut (not shown) at an opposing end of the central bore 326. The central bore 326 allows the handle assembly 318 to move along a longitudinal axis, as shown by arrows (C), of the threaded member 316. To secure the cross bow member 28 to the left sidewall 108, the rear latch assembly 302 is slid along the inwardly turned flanges 338 of the cross bow member 28 using a gripping portion 333 beneath a handle portion 320 of the handle assembly 318 until an engaging portion 331 of the handle assembly 318 abuts the left sidewall 108. Once abutted, the handle assembly 318 is pulled substantially perpendicular away from the cross bow member 28, downward as indicated by upper arrow (C), so that the engaging portion 331 is positioned around a bottom edge of the left sidewall 108. Once the engaging portion 331 is positioned and the handle assembly 318 is released, a biasing member (not shown) inside the handle assembly 318 biases, upward as indicated by lower arrow (C), and secures the rear latch assembly 302 in place by acting between an internal wall of the central bore 326 and the retaining nut to impart a compression force upon the cross bow member 28 and the left sidewall 108.

Figure 5:
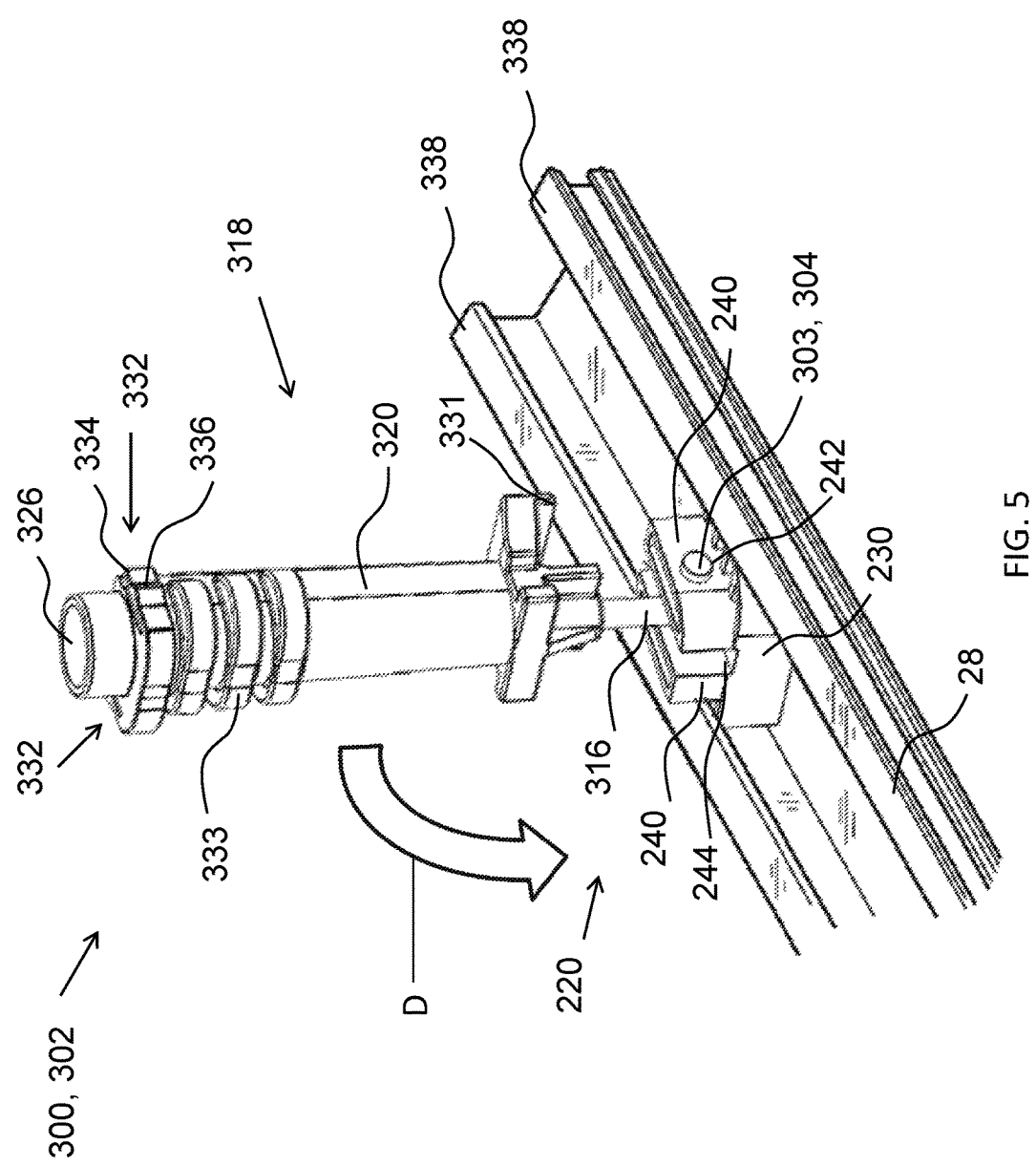
FIG. 5 is an enlarged perspective view of a rear latch assembly of a rear tonneau section.

FIG. 5 illustrates an enlarged perspective view of a latch assembly 300 that is a rear latch assembly 302 secured in a cross bow member 28 in an extended position. In addition to the features of a rear latch assembly 302 as described in FIG. 4, the handle assembly 318 further includes a plurality of locking clips 332 located along the gripping portion 333 to secure the rear latch assembly 300 to the cross bow member 28 when in a nested position. The locking clips 332 each include a cantilever portion 334 and a locking feature 336. The cantilever portions 334 flex inwardly as the handle portion 320 is pushed, in the direction indicated by arrow (D), toward the cross bow member 28 until the locking features 336 pass the inwardly turned flanges 338 of the cross bow member 28. Once the cantilever portions 334 pass the inwardly turned flanges 338, they expand until the locking features 336 engage the inwardly turned flanges 338, securing the rear latch assembly 302 in the nested position (not shown). As the rear latch assembly 302 is moved from the extended position to the nested position, the threaded member 316 pivots about an axis of the trunnion assembly 303 to be secured in a notch 244 of the head 220 located between the plurality of receiving portions 240.

FIG. 6 illustrates an enlarged perspective view of a latch assembly 300 that is a front latch assembly 301. A head 220 of the front latch assembly 301 includes a locking portion 230 that secures the front latch assembly 301 to a cross member (as shown in FIG. 3). The head 220 further includes a plurality of receiving portions 240 projecting substantially perpendicular to a bottom surface of the locking portion 230. The plurality of receiving portions 240 each include a receiving hole (not shown) to receive and secure a trunnion assembly 303. The trunnion assembly 303 is inserted into the receiving holes so that trunnion ends 304 on opposing sides of a trunnion main body 306 are secured in the receiving holes. A first end of a threaded member 316 is threaded into a receiving hole (not shown) of the trunnion main body 306 and projects substantially perpendicular to the trunnion main body 306. The head 220 includes a notch 244 that allows the trunnion main body 306 to rotate relative to the head 220 when the head 220 is located within the cross bow member 28. An opposing second end of the threaded member 316 extends through a slidable catch 206 and is threaded into a corresponding fastener 212. An aperture 310 of the slidable catch 206 allows the slidable catch 206 to move along a longitudinal axis of the threaded member 316 to position an engaging portion 331 of the slidable catch 206. A member 219 is secured around an exposed portion of the threaded member 316 to protect from environmental or other degradation.

FIG. 7 illustrates an enlarged top view of a locking portion 230 of a latch assembly 300 having a length $L_H$ and a width $W_H$. The locking portion 230 includes two fillets 234 at diagonally opposing positions of the locking portion 230. Each of the fillets 234 are arcuate and include a radius (r) that permits rotation of the locking portion 230 within a cross bow member (as shown in FIGS. 3 and 4). Sidewalls 232 extending from the fillets 234 connect to two corners 236 having an angle ($\alpha$). The corners 236 are diagonally opposing positions from each other and, as shown, form substantially a right angle. When the locking portion 230 is inserted into the cross bow member, the locking portion 230 is rotated approximately 90 degrees so that the fillets 234 slide along interior walls of the cross bow member until the corners 236 are positioned above inwardly turned flanges of the cross bow member.

Figure 8:
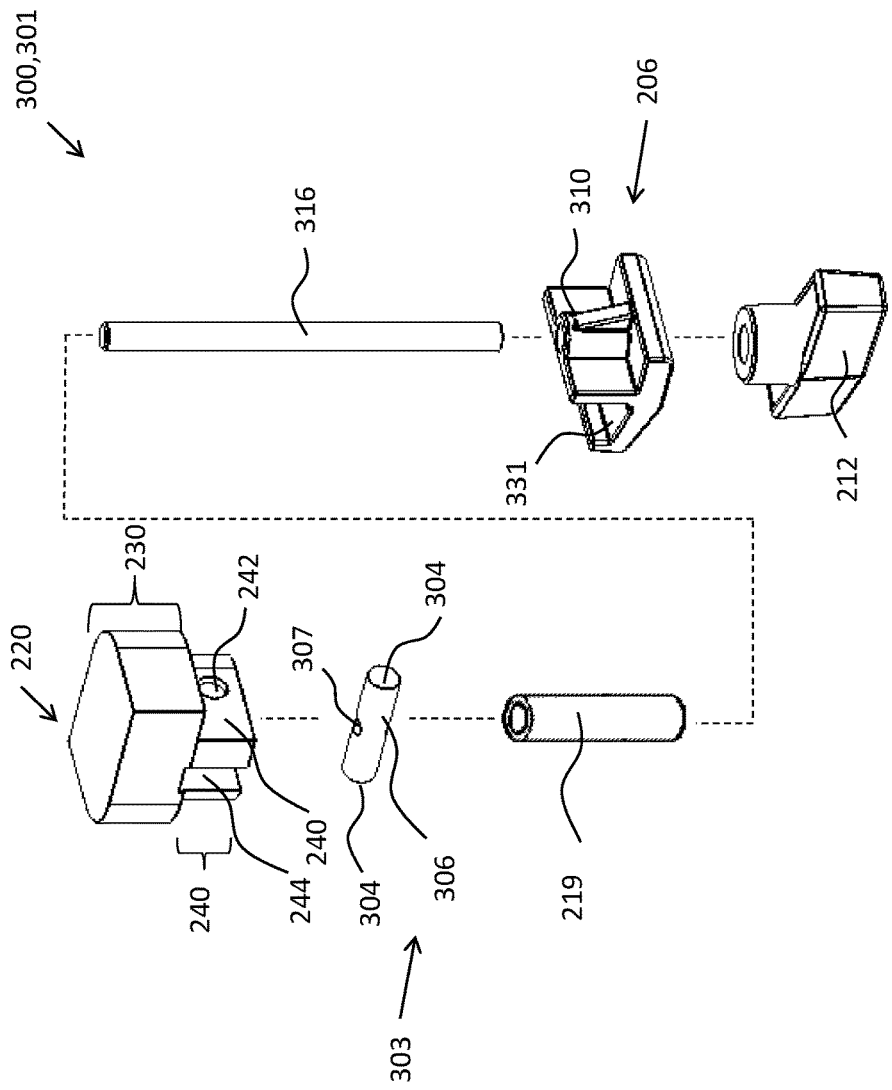
FIG. 8 is an exploded view of a front latch assembly.

FIG. 8 illustrates an exploded view of a latch assembly 300 that is a front latch assembly 301. A head 220 of the front latch assembly 200 includes a locking portion 230 that secures the front latch assembly 301 to a cross bow member (as shown in FIG. 3). The head 220 further includes a plurality of receiving portions 240 projecting substantially perpendicular to a bottom surface of the locking portion 230. The plurality of receiving portions 240 each include a receiving hole 242 to receive and secure a trunnion assembly 303. The trunnion assembly 303 is inserted into the receiving holes 242 so that trunnion ends 304 on opposing sides of a trunnion main body 306 are secured in the receiving holes 242. A first end of a threaded member 316 is threaded into a receiving hole 307 of the trunnion main body 306 and projects substantially perpendicular to the trunnion main body 306. The head 220 further includes a notch 244 between the receiving portions 240 to allow the threaded member 316 to pivot about the trunnion assembly 303 to one or more positions substantially parallel to the bottom surface of the locking portion 230. An opposing second end of the threaded member 316 extends through a slidable catch 206 and is threaded into a corresponding fastener 212. An aperture 310 of the slidable catch 206 allows the slidable catch 206 to move along a longitudinal axis of the threaded member 316 to position an engaging portion 331 of the slidable catch 206 so that the engaging portion 331 engages a sidewall of a cargo box (as shown in FIG. 3). Additionally, a member 219 is secured around an exposed portion of the threaded member 316 to protect from environmental or other degradation.

FIG. 9 illustrates an enlarged perspective view of a latch assembly 300 that is a rear latch assembly 302. A head 220 of the rear latch assembly 302 includes a locking portion 230 that secures the rear latch assembly 302 to a cross bow member (as shown in FIG. 4). The head 220 further includes a plurality of receiving portions 240 projecting substantially perpendicular to a bottom surface of the locking portion 230. The plurality of receiving portions 240 each include a receiving hole 242 to receive and secure a trunnion assembly 303. The trunnion assembly 303 is inserted into the receiving holes 242 so that trunnion ends 304 are secured in the receiving holes 242. A first end of a threaded member 316 is threaded into the trunnion assembly 303 and projects substantially perpendicular to the trunnion assembly 303. An opposing second end of the threaded member 316 extends through a central bore 326 of a handle assembly 318 and is threaded into a retaining nut (not shown) at an opposing end of the central bore 326. The central bore 326 allows the handle assembly 318 to move along a longitudinal axis of the threaded member 316. A gripping portion 333 abuts a handle portion 320 of the handle assembly 318. The gripping portion 333 can be pulled away from the head 220 to position an engaging portion 331 around a bottom edge of a sidewall (as shown in FIG. 4). Once the engaging portion 331 is positioned and the handle assembly 318 is released, a biasing member (as shown in FIG. 10) inside the handle assembly 318 biases and secures the rear latch assembly 302 in place by acting between an internal wall of the central bore 326 and the retaining nut (not shown) to impart a compression force between the locking portion 230 and engaging portion 331.

FIG. 10 illustrates an exploded view of a latch assembly that is a rear latch assembly 302. A head 220 of the rear latch assembly 302 includes a locking portion 230 that secures the rear latch assembly 302 to a cross bow member (as shown in FIG. 4). The head 220 further includes a plurality of receiving portions 240 projecting substantially perpendicular to a bottom surface of the locking portion 230. The plurality of receiving portions 240 each include a receiving hole 242 to receive and secure a trunnion assembly 303. The trunnion assembly 303 is inserted into the receiving holes 242 so that trunnion ends 304 on opposing sides of a trunnion main body 306 are secured in the receiving holes 242. A first end of a threaded member 316 is threaded into a receiving hole 307 of the trunnion main body 306 and projects substantially perpendicular to the trunnion main body 306. The head 220 further includes a notch 244 between the receiving portions 240 to allow the threaded member 316 to pivot about the trunnion assembly 303 to one or more positions substantially parallel to the bottom surface of the locking portion 230. An opposing second end of the threaded member 316 extends through a central bore 326 of a handle assembly 318 and is threaded into a retaining nut 324 at an opposing end of the central bore 326. The threaded member 316 is threaded into a threaded opening 327 of the retaining nut 324. The central bore 326 allows the handle assembly 318 to move along a longitudinal axis of the threaded member 316. A gripping portion 333 abuts a handle portion 320 of the handle assembly 318. The gripping portion 333 can be pulled away from the head 220 to position an engaging portion 331 around a bottom edge of a sidewall (as shown in FIG. 4). Once the engaging portion 331 is positioned and the handle assembly 318 is released, a biasing member 322 inside the handle assembly 318 biases and secures the rear latch assembly 302 in place by acting between an internal wall of the central bore 326 and a flange 328 of the retaining nut 327 to impart a compression force between the locking portion 230 and engaging portion 331.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A latch assembly comprising:
   I. a head having:
      a. two corners; and
      b. two fillets that are each connected to the two corners by a sidewall that extends between each of the two fillets and each of the two corners; and
   II. an engaging portion coupled to the head, the engaging portion being configured to engage a wall of a cargo box of a pickup truck to compressibly secure a foldable tonneau system to the cargo box;
      wherein two of the sidewalls extending between the two corners and the two fillets form a locking portion that is configured to lock the latch assembly in a cross bow member of the foldable tonneau system when the latch assembly is in communication with the cross bow member, and the latch assembly is configured to be insertable and removable from the cross bow member of the foldable tonneau system without disassembly of the cross bow member while also being positionable between an extended position and a nested position by pivotally moving the engaging portion relative to the head.

2. The latch assembly according to claim 1, wherein the head of the latch assembly can be inserted into a cross-sectional area of the cross bow member at any position along a length of the cross bow member.

3. The latch assembly according to claim 1, wherein the head is rotatable approximately 90 degrees to secure the locking portion of the head on a plurality of flanges of the cross bow member.

4. The latch assembly according to claim 1, wherein the locking portion is rotatable inside a cross-sectional area of the cross bow member so that a length of the head is greater than a width of a gap between a plurality of flanges of the cross bow member, and a bottom surface of the locking portion rests on the plurality of flanges.

5. The latch assembly according to claim 1, further comprising:
   I. one or more receiving portions projecting substantially perpendicular from a bottom surface of the locking portion, the one or more receiving portions having one or more receiving holes;
   II. a trunnion assembly secured by the one or more receiving holes; and
   III. a threaded member fixedly attached at a first end to a main body of the trunnion assembly;
      wherein the engaging portion is movably secured to the threaded member so that the engaging portion is movable along a longitudinal axis of the threaded member to engage the wall of the cargo box.

6. The latch assembly according to claim 1, wherein the two corners of the locking portion form substantially right angles.

7. The latch assembly according to claim 1, wherein the engaging portion is pivotally engaged to the head by a threaded member connecting the engaging portion to a trunnion assembly that is secured in the head.

8. The latch assembly according to claim 5, wherein the one or more receiving portions are overmolded around opposing trunnion ends of the trunnion assembly so that the trunnion assembly is free to rotate about an axis of the one or more receiving holes.

9. The latch assembly according to claim 5, wherein the engaging portion engages the wall of the cargo box by tightening a corresponding fastener at an opposing second end of the threaded member.

10. The latch assembly according to claim 1, wherein the latch assembly is both slidably and pivotally coupled to the cross bow member.

11. The latch assembly according to claim 1, wherein the latch assembly is configured to be removable from the cross bow member after the foldable tonneau system is secured to the cargo box of the pickup truck.

12. The latch assembly according to claim 1, wherein the latch assembly can be inserted and secured into a cross-sectional area of the cross bow member after the foldable tonneau system is secured to the cargo box of the pickup truck.

13. The latch assembly according to claim 1, wherein the cross bow member has a substantially C-shaped cross-sectional area.

14. A method comprising:
I. inserting the head of the latch assembly according to claim 1 into a cross-sectional area of the cross bow member of the foldable tonneau system so that a length of the head is substantially perpendicular to a width of the cross bow member; and
II. rotating the head within the cross-sectional area so that the length of the head is substantially parallel to the width of the cross bow member, the rotation securing the locking portion of the head on a plurality of flanges of the cross bow member to allow the latch assembly to slide along a longitudinal axis of the cross bow member.

15. The method according to claim 14, wherein the head of the latch assembly can be inserted into the cross-sectional area of the cross bow member at any position along a length of the cross bow member.

16. The method according to claim 14, wherein the length of the head is greater than a width of a gap between the plurality of flanges.

17. The method according to claim 14, wherein the cross bow member has a substantially C-shaped cross-sectional area.

18. A latch assembly comprising:
I. a head including:
 a. a locking portion having:
  i. two corners; and
  ii. two fillets that are each connected to the two corners by a sidewall that extends between each of the two fillets and each of the two corners, each of the fillets creating a generally arcuate surface;
 b. two or more receiving portions projecting from a bottom surface of the locking portion, the two or more receiving portions having one or more receiving holes;
 c. a notch located between the two or more receiving portions; and
II. a trunnion assembly secured to the head by the two or more receiving portions and the trunnion assembly being rotatable relative to the head;
III. a threaded member attached to the trunnion assembly; and
IV. an engaging portion coupled to the head by the threaded member and pivotally engaged to the trunnion assembly, the engaging portion being configured to engage a wall of a cargo box of a pickup truck to compressibly secure a foldable tonneau system to the cargo box;
 wherein the locking portion of the head is configured to engage inside a cross-sectional area of a cross bow member so that the latch assembly is capable of being added to or removed from the cross bow member without disassembly of the cross bow member or the latch assembly.

19. The latch assembly according to claim 18, wherein the threaded member is pivotally engaged to the trunnion assembly to move between an extended position and a nested position, the threaded member being configured to be received by the notch while in the nested position.

20. The latch assembly according to claim 18, wherein the engaging member includes a biasing member that compresses the engaging portion relative to the head of the latch assembly so that the engaging portion compressibly secures the foldable tonneau system to the cargo box.

* * * * *